(12) United States Patent
Zaima et al.

(10) Patent No.: US 11,869,550 B2
(45) Date of Patent: Jan. 9, 2024

(54) HEAD SUSPENSION ASSEMBLY AND MAGNETIC RECORDING/REPRODUCING DEVICE

(71) Applicants: Kabushiki Kaisha Toshiba, Tokyo (JP); Toshiba Electronic Devices & Storage Corporation, Tokyo (JP)

(72) Inventors: Shino Zaima, Kanagawa (JP); Akiyo Mizutani, Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/814,038

(22) Filed: Jul. 21, 2022

(65) Prior Publication Data

US 2023/0169995 A1    Jun. 1, 2023

(30) Foreign Application Priority Data

Dec. 1, 2021    (JP) ................................ 2021-195480

(51) Int. Cl.
*G11B 5/48*    (2006.01)
(52) U.S. Cl.
CPC .................................. *G11B 5/484* (2013.01)
(58) Field of Classification Search
None
See application file for complete search history.

(56) References Cited

U.S. PATENT DOCUMENTS

| | | | | |
|---|---|---|---|---|
| 5,130,162 A | * | 7/1992 | Ogawa | G11B 7/26 427/407.1 |
| 5,879,578 A | * | 3/1999 | Chung | G11B 5/4833 |
| 6,035,681 A | * | 3/2000 | Chung | G11B 5/60 |
| 7,024,754 B1 | * | 4/2006 | Crowder | G11B 5/4813 184/14 |
| 7,624,495 B1 | * | 12/2009 | Crowder | G11B 5/4813 184/14 |
| 8,537,498 B2 | | 9/2013 | Yabu et al. | |
| 8,745,844 B2 | | 6/2014 | Hanya | |
| 2003/0156357 A1 | * | 8/2003 | Brink | G11B 5/4813 |
| 2006/0289311 A1 | * | 12/2006 | Brink | G11B 5/4813 205/205 |
| 2012/0023734 A1 | | 2/2012 | Hanya | |
| 2013/0100556 A1 | | 4/2013 | Yabu et al. | |

FOREIGN PATENT DOCUMENTS

| | | | | |
|---|---|---|---|---|
| JP | H07192420 A | * | 7/1995 | ............. G11B 21/16 |
| JP | 2008-293819 A | | 12/2008 | |
| WO | WO-2010068531 A1 | * | 6/2010 | ............. B05D 1/185 |

OTHER PUBLICATIONS

Sugimura, Hiroyuki; "Self-Assembled Molecular Films" (14.6$^{th}$ ed.), Oct. 6, 2016, pp. 1-82; https://www.nsa.mtl.kyoto-u.ac.jp/wpcontent/uploads/2014/02/Introduction-To-SAM.pdf.

* cited by examiner

*Primary Examiner* — William J Klimowicz
(74) *Attorney, Agent, or Firm* — Knobbe, Martens, Olson & Bear, LLP

(57) ABSTRACT

According to one embodiment, a head suspension assembly comprises a structure which prevents a lubricant to be used for a caulking portion of an actuator arm from spreading.

4 Claims, 5 Drawing Sheets

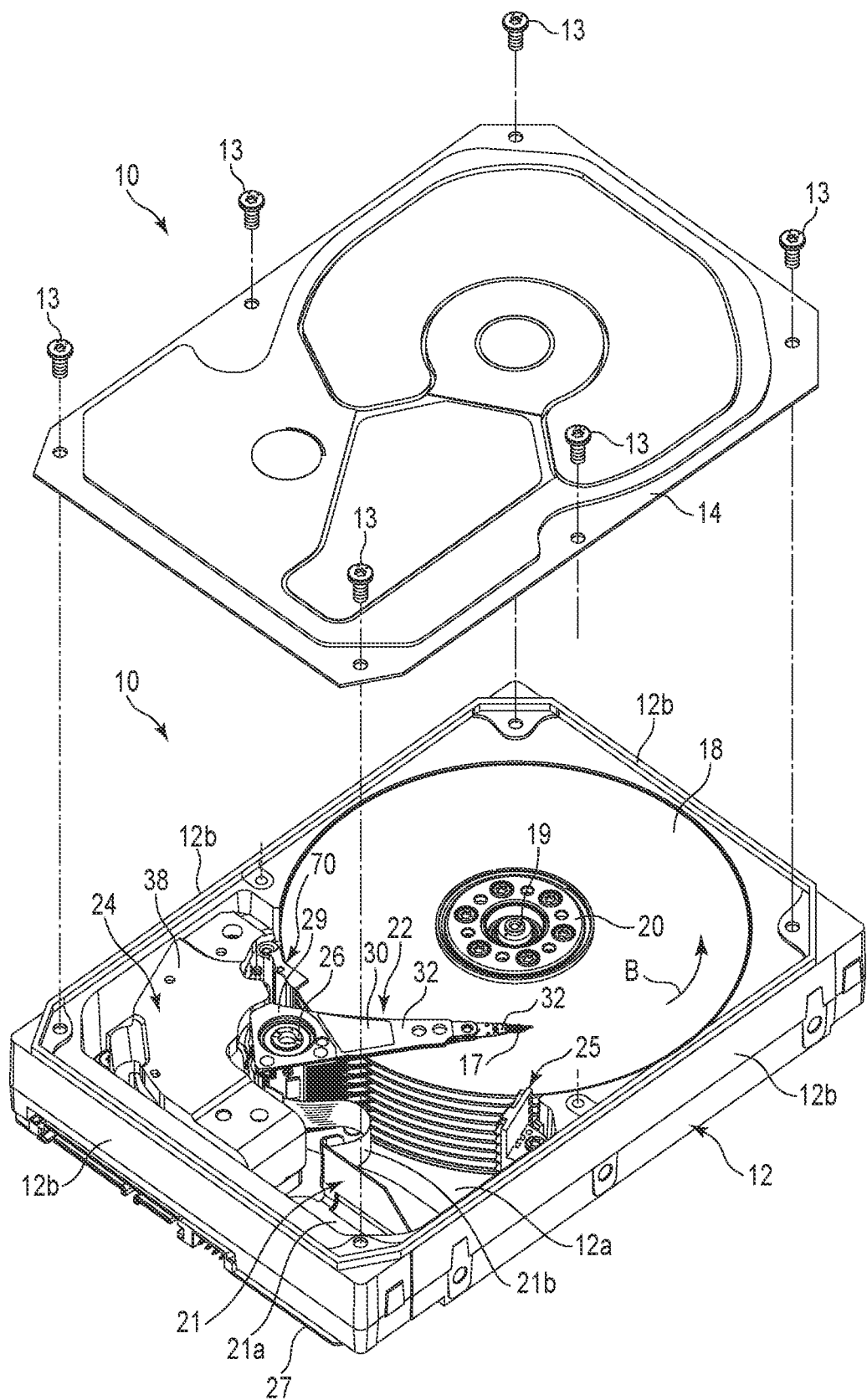
F I G. 1

HEAD SUSPENSION ASSEMBLY AND MAGNETIC RECORDING/REPRODUCING DEVICE

CROSS-REFERENCE TO RELATED APPLICATIONS

This application is based upon and claims the benefit of priority from Japanese Patent Application No. 2021-195480, filed Dec. 1, 2021, the entire contents of which are incorporated herein by reference.

FIELD

Embodiments described herein relate generally to a head suspension assembly and magnetic recording/reproducing device.

BACKGROUND

In the manufacture of a head gimbal assembly (HGA), when a base plate of the head suspension assembly and caulking portion provided on the actuator arm are to be joined to each other, a process of carrying out caulking by using a ball is carried out. In order to reduce the friction of the calking portion and prevent a characteristic change of the HGA attributable to a deformation or defect of the base plate from occurring, the ball to be used is coated with a lubricant. However, when the head is operated, the lubricant adhering to the caulking portion spreads over to wet the base plate, moves toward the tip end of the HGA, and liquid droplets of the lubricant scatter over the magnetic disk to thereby cause a High Fly Write (HFW) failure in some cases.

BRIEF DESCRIPTION OF THE DRAWINGS

FIG. 1 is a perspective view showing a hard disk drive (HDD) according to a first embodiment by disassembling a top cover.

DETAILED DESCRIPTION

Figure 2:
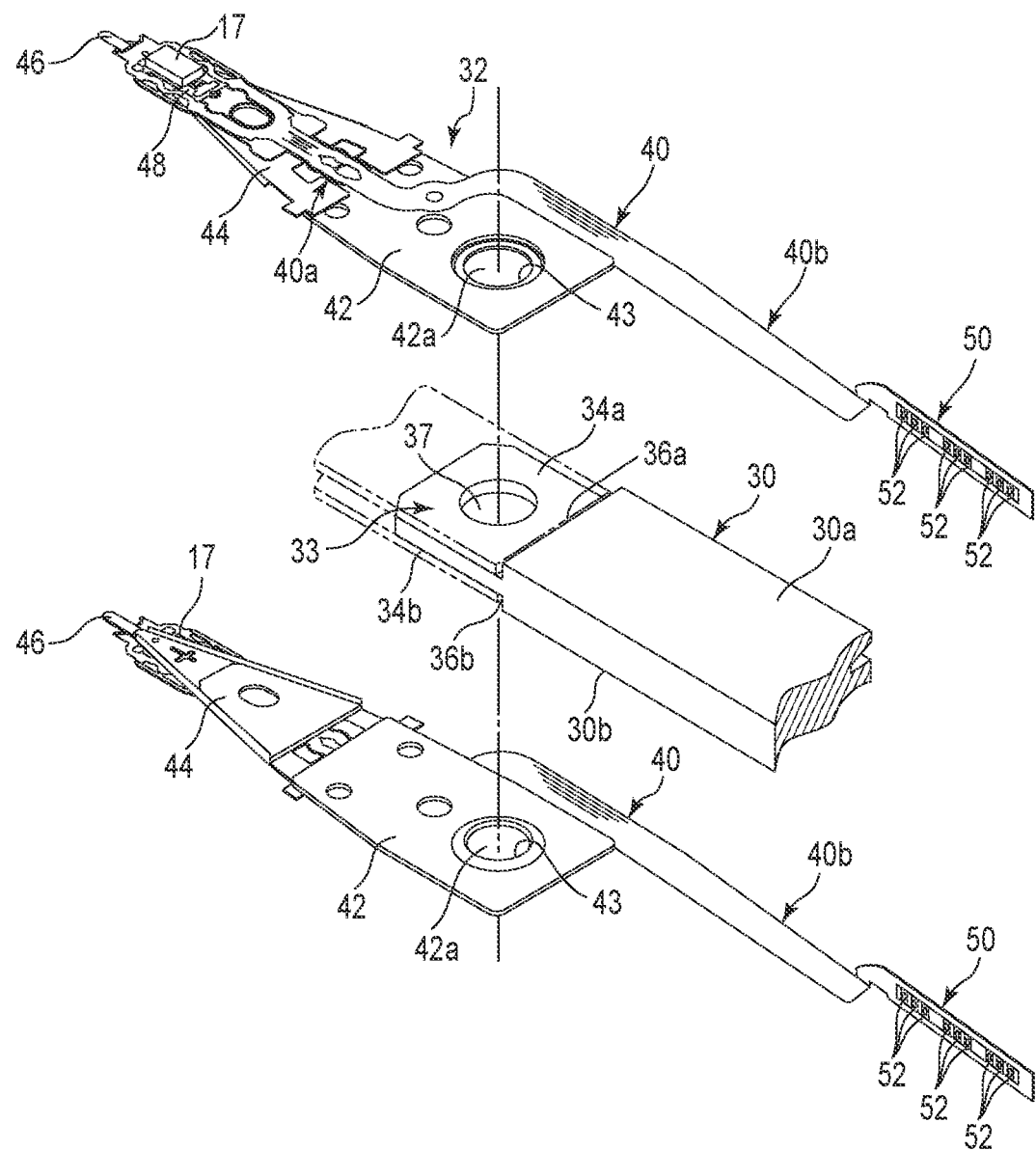
FIG. 2 is a perspective view showing an arm of an actuator assembly and suspension assemblies.

In general, according to one embodiment, a head suspension assembly comprises a structure which prevents a lubricant to be used for a caulking portion of an actuator arm from spreading.

According to another embodiment, a magnetic recording/reproducing device comprises magnetic recording medium, and head suspension assembly which comprises a structure that prevents a lubricant to be used for a caulking portion of an actuator arm from spreading.

Hereinafter, a magnetic recording/reproducing device according to an embodiment will be described with reference to the accompanying drawings.

The disclosure is merely an example and is not limited by contents described in the embodiments described below.

Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by the same reference numerals and their detailed descriptions may be omitted unless necessary.

A hard disk drive (HDD) according to a first embodiment will be described below in detail as a magnetic recording/reproducing device.

FIG. 1 is an exploded perspective view showing an HDD according to a first embodiment by disassembling a top cover.

The HDD includes a housing 10 having a flat and approximately rectangular shape. The housing 10 includes a base 12 having a rectangular box-like shape and including an upper opening, and top cover 14. The base 12 includes a rectangular bottom wall 12a opposed to the top cover 14 with a gap held between them, and a plurality of sidewalls 12b vertically provided along the circumference of the bottom wall 12a, and is integrally formed of, for example, aluminum. The top cover 14 is formed of, for example, stainless steel into a rectangular plate-like shape. The top cover 14 is screwed onto the sidewalls 12b of the base 12 by means of a plurality of screws 13 and the upper opening of the base 12 is thereby closed.

Inside the housing 10, a plurality of magnetic disks 18 serving as recording media and spindle motor 19 serving as a drive portion configured to support thereon and rotate the magnetic disks 18 are provided. The spindle motor 19 is arranged on the bottom wall 12a. Each of the magnetic disks 18 is formed into a discoid shape having a diameter of, for example, 96 mm (about 3.5 inch) and thickness of about 0.5 mm, and includes a magnetic recording layer in the upper surface and/or lower surface thereof. The magnetic disks 18 are coaxially fitted onto a hub (not shown) of the spindle motor 19 and are clamped with a clamp spring 20 so as to be fixed to the hub. In an example, the magnetic disks 18 are arranged in a form of layers in parallel with each other with predetermined intervals held between them. The magnetic disks 18 are supported in a state where the disks 18 are positioned in parallel with the bottom wall 12a of the base 12. The magnetic disks 18 are rotated by the spindle motor 19 at a predetermined rotational speed.

Inside the housing 10, a plurality of magnetic heads 17 each configured to carry out recording/reproduction of information on/from the magnetic disks 18, and head actuator assembly (referred to as a head actuator in some cases) movably supporting thereon these magnetic heads 17 relatively to the magnetic disks 18 are provided. The actuator assembly 22 is supported on a common support shaft (rotating shaft) 26 vertically provided on the bottom wall 12a of the base 12 in such a manner as to be swingable around the shaft 26.

Inside the housing 10, a voice coil motor (VCM) 24 configured to turn and position the actuator assembly 22, ramp load mechanism 25 configured to retain the magnetic head 17 at an unload position separate from the magnetic disk 18 when the magnetic head 17 is moved to the outermost circumference of the magnetic disk 18, and wiring board unit (FPC unit) 21 on which electronic components such as a conversion connector and the like are implemented are provided.

A printed circuit board (not shown) is screwed onto the outer surface of the bottom wall 12a. The printed circuit board constitutes a controller, and this controller controls the operation of the spindle motor 19 and further controls the operations of the VCM 24 and magnetic heads 17 through the wiring board unit 21.

FIG. 2 is a perspective view schematically showing an arm and suspension assemblies.

Figure 3:
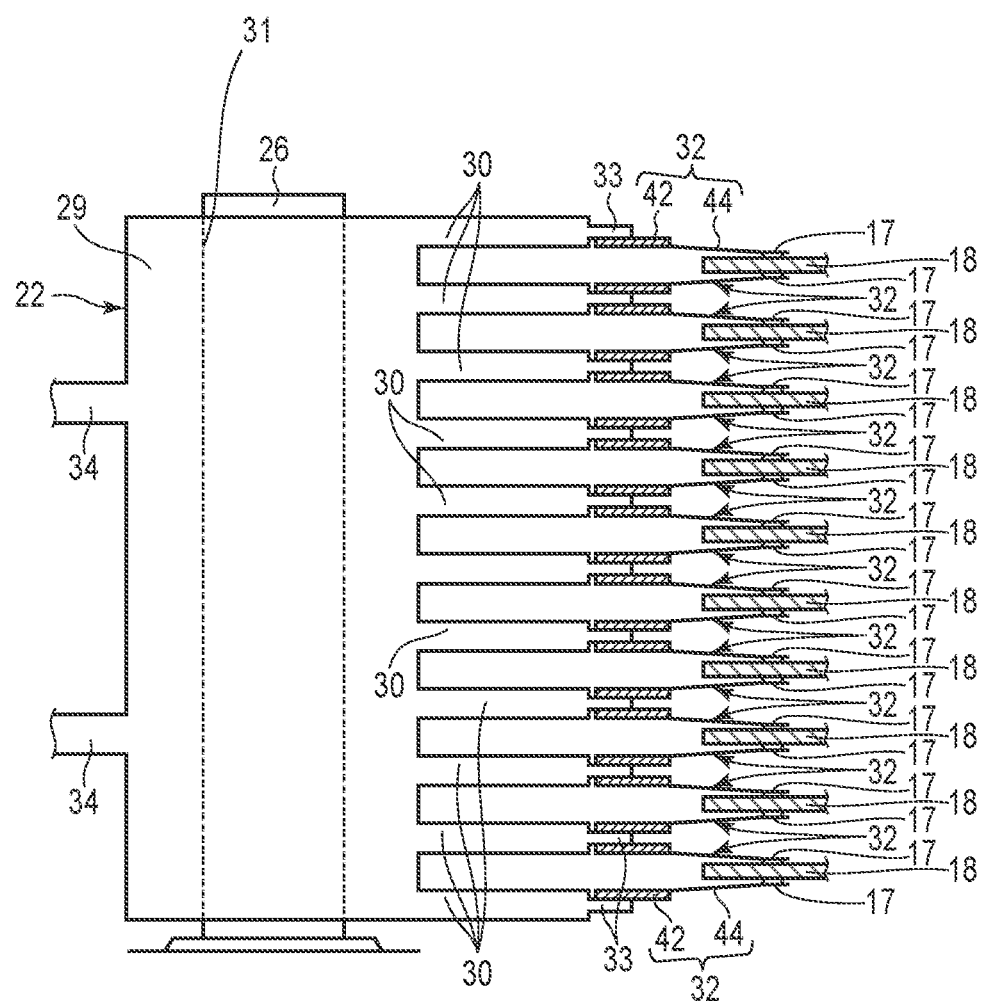
FIG. 3 is a side view schematically showing the actuator assemblies in a positioned state.

FIG. 3 is aside view schematically showing the actuator assemblies in an positioned state.

As shown in FIG. 2 and FIG. 3, the actuator assembly 22 includes an actuator block 29, arms 30 outwardly extending from the actuator block 29, head suspension assembly (referred to as a head gimbal assembly (HGA) in some cases) 32 attached to each of the arms 30, and magnetic head 17 supported on each head suspension assembly. The actuator block 29 includes an inner hole 31, and a bearing unit (unit bearing) (not shown) is provided inside the inner hole 31. The actuator block 29 is rotatably supported on the support shaft 26 by the bearing unit.

In this embodiment, the actuator block 29 and arms 30 are formed of aluminum or the like integral with each other and a so-called E-block is thereby formed. The arm 30 is formed into, for example, a long and thin flat plate-like shape, and outwardly extends from the actuator block 29 in a direction perpendicular to the support shaft 26. The arms 30 are arranged in a line in the axial direction of the support shaft 26, and are provided in parallel with each other with gaps held between them. In this embodiment, the arms 30 are formed into the same shape of the same dimensions. Further, the number of the arms 30 can appropriately be changed according to the number of the magnetic disks 18.

The actuator assembly 22 includes a plurality of head suspension assemblies 32, and these head suspension assemblies 32 are each attached to the extension ends of the arms 30.

As shown in FIG. 2, each of the arms 30 is formed into a plate-like shape including a first principal surface 30a and second principal surface 30b opposed to the first principal surface 30a in parallel therewith. A caulking portion (fixing portion) 33 having a small thickness is formed at an extension end (tip end portion) of the arm 30. That is, the caulking portion 33 includes a first mounting surface 34a positioned one step lower than the first principal surface 30a, and thus a step portion 36a is formed between the first principal surface 30a and first mounting surface 34a. The caulking portion 33 includes a second mounting surface 34b positioned one step lower than the second principal surface 30b, and thus a step 36b is formed between the second principal surface 30b and second mounting surface 34b. The second mounting surface 34b is opposed to the first mounting surface 34a in parallel therewith. The caulking portion 33 includes a circular caulking hole 37 formed in such a manner as to penetrate the first mounting surface 34a and second mounting surface 34b. In an example, the plate thickness of the arm 30 is set at about 0.78 mm, heights of the step portions 36a and 36b are each set at about 0.1 mm. The thickness of the caulking portion 33 is set at about 0.5 mm.

The head suspension assembly 32 includes a suspension functioning as a support plate, and wiring member (flexure) 40 arranged on the suspension.

The suspension includes a rectangular base plate 42 constituted of a metallic plate having a thickness of several hundred microns, and load beam 44 having a shape of a long and thin leaf spring and constituted of a metallic plate having a thickness of several tens of microns. The base plate 42 and load beam 44 are formed of, for example, stainless steel. In an example, the plate thickness of the base plate 42 is set at about 150 μm, and plate thickness of the load beam 44 is set at about 25 to 30 μm.

The load beam 44 is fixed to the base plate 42 by being arranged in such a manner that a base end portion thereof overlaps the tip end portion of the base plate 42 and by being welded to the base plate 42 at a plurality of positions thereof. A width of the base end portion of the load beam 44 is made approximately equal to the width of the base plate 42. A rod-like tab 46 is provided at a tip end of the load beam 44 in a protruding manner.

The base plate 42 includes a circular opening 42a at a base end portion thereof and annular protrusion 43 positioned around an inner circumference of the opening 42a. The base plate 42 is fastened to the tip end portion of the arm 30 by fitting the protrusion 43 thereof in the caulking hole 37 of the caulking portion 33 in a state where the base end portion thereof is arranged on the first mounting surface 34a or on the second mounting surface 34b of the caulking portion 33 of the arm 30, and caulking the protrusion 43.

The flexure 40 includes a metallic plate (lining layer) of stainless steel or the like, insulating layer formed on the metallic plate, conducting layer constituting a plurality of wiring members (wiring patterns) formed on the insulating layer, and cover layer (protecting layer, insulating layer) covering the conducting layer, and is formed into a long and thin strip-like laminated sheet. The flexure 40 includes a tip end side portion 40a and base end side portion 40b. The tip end side portion 40a is attached to portions on the load beam 44 and base plate 42. The base end side portion 40b outwardly extends from the side edge of the base plate 42 and further extends to the base end portion of the arm 30 along the arm 30.

A art of the tip end side portion 40a constitutes a freely-displaceable gimbal portion (elastic supporting portion) 48. The gimbal portion 48 is positioned on the load beam 44. The magnetic head 17 is mounted on the gimbal portion 48. The wiring of the flexure 40 is electrically connected to the read element of the magnetic head 17, write element, heater, and other members.

The base end side portion 40b of the flexure 40 outwardly extends from the side edge of the base plate 42 and, thereafter extends to the actuator block 29 along the side surface of the arm 30. A connection end portion (tail connection terminal portion) 50 of the flexure 40 is formed at the rear end of the base end side portion 40b. A plurality of connection terminals (connection pads) 52 are provided on the connection end portion 50. These connection terminals 52 are each connected to the wiring of the flexure 40. The connection end portion 50 is joined to a joining portion (wiring board) 58 of a flexible printed wiring board (FPC) provided on the mounting surface of the actuator block 29. Thereby, the magnetic head 17 is electrically connected to the FPC through the flexure 40.

As shown in FIG. 2 and FIG. 3, the actuator assembly 22 includes a plurality of head suspension assemblies 32, and these head suspension assemblies 32 are each attached to the extension ends (caulking portions 33) of the arms 30 serving as the actuator arms. The plurality of head suspension assemblies 32 include an up-head head suspension assembly upwardly supporting thereon a magnetic head 17 and down-head head suspension assembly downwardly supporting thereon a magnetic head 17. These up-head suspension assembly and down-head suspension assembly are configured by arranging head suspension assemblies of the same structure in such a manner that the assemblies are oppositely directed in the vertical direction. In this embodiment, in the actuator assembly 22, only a down-head suspension assembly is attached to the arm 30 of the uppermost part in the axial direction. More specifically, the base plate 42 of the head suspension assembly 32 is fixed to the second mounting surface (lower mounting surface) 34b of the caulking portion 33. Only an up-head suspension assembly is attached to the arm 30 of the lowermost part in the axial direction. More specifically, the base plate 42 of the head suspension assembly 32 is fixed to the first mounting surface (upper mounting surface) 34a of the caulking portion 33.

Two head suspension assemblies 32 including an up-head suspension assembly and down-head suspension assembly are attached to each of the other arms 30. A suspension assembly 32 is fixed to each of the first mounting surface 34a and second mounting surface 34b of the caulking portion 33 of each of the arms 30.

These head suspension assemblies 32 each outwardly extend from the arms 30 and are arranged with predetermined intervals held between them. Two magnetic heads 17 supported on the down-head suspension assembly 32 and up-head suspension assembly 32 both constituting an up/down pair are positioned in opposition to each other with a predetermined interval held between them. These magnetic heads 17 are positioned in opposition to both the surfaces of a corresponding magnetic disk 18.

Figure 4:
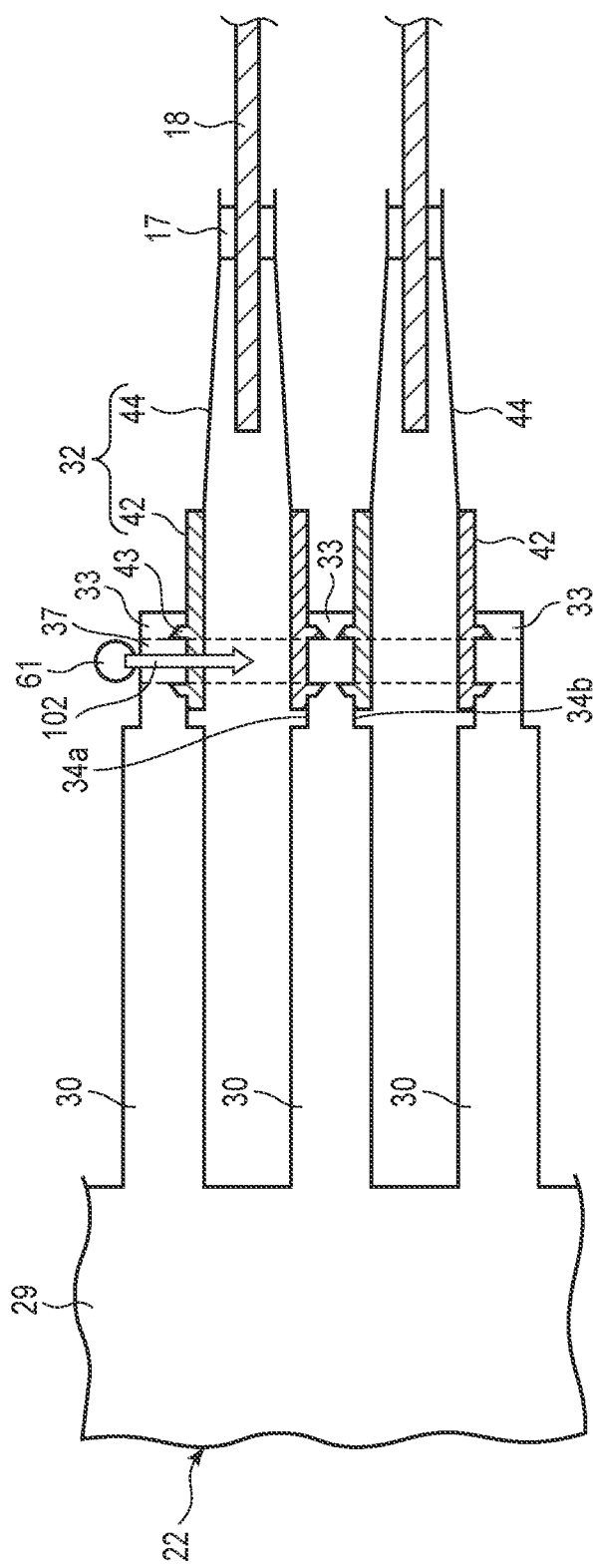
FIG. 4 is a side view schematically showing tip end portions of two arms opposed to each other and suspension assemblies.

In FIG. 4, a view for explaining an example of a caulking process of the caulking portion is shown.

Here, some of the arms 30 of the actuator assembly 22 of FIG. 3 are shown in an enlarging manner.

As shown in FIG. 4, in the caulking process of the caulking portion, first, the protrusion 43 of the base plate 42 is fitted in the caulking hole 37 provided in the caulking portion 33 in a state where the base end portion of the base plate 42 is arranged on the first mounting surface 34a or second mounting surface 34b of the caulking portion 33 of the arm 30. Next, a caulking ball 61 is coated with a lubricant. By moving the ball 61 coated with the lubricant in the direction of an arrow 102 and passing the ball 61 through the caulking holes 37 in sequence, each of the protrusions 43 is plastically deformed in the diameter-expanding direction and is thereby fixed to each of the caulking portions 33.

At this time, an excess of the lubricant applied to the ball 61 adheres to the caulking portion 33 and periphery thereof.

The head suspension assembly 32 according to the embodiment includes a structure configured to prevent spreading of the lubricant used for the caulking portion of the actuator arm from occurring. Therefore, according to the head suspension assembly according to the embodiment, it is possible to, owing to the aforementioned structure, prevent the lubricant from spreading and moving to the tip end of the head 17, and prevent contamination of the head 17 from occurring.

Further, in the magnetic recording/reproducing device 10 according to the embodiment, by using the aforementioned head suspension assembly 32, it becomes possible to prevent contamination of the head 17 attributable to the lubricant from occurring, and it is possible to prevent the liquid droplets of the lubricant from scattering and causing an HFW failure and enhance the reliability of the magnetic recording/reproducing device.

The structure configured to prevent spreading of the lubricant used for the caulking portion of the actuator arm from occurring can be provided at least at a part of the head suspension assembly 32. Such a structure can be provided at least a part of, for example, the base plate 42 to be attached to the arm 30 by the caulking portion 33. Thereby, it is possible to structure a system configured to trap the lubricant in at least a part on the base plate 42 lest the lubricant should move to the tip end of the head 17.

Figure 5:
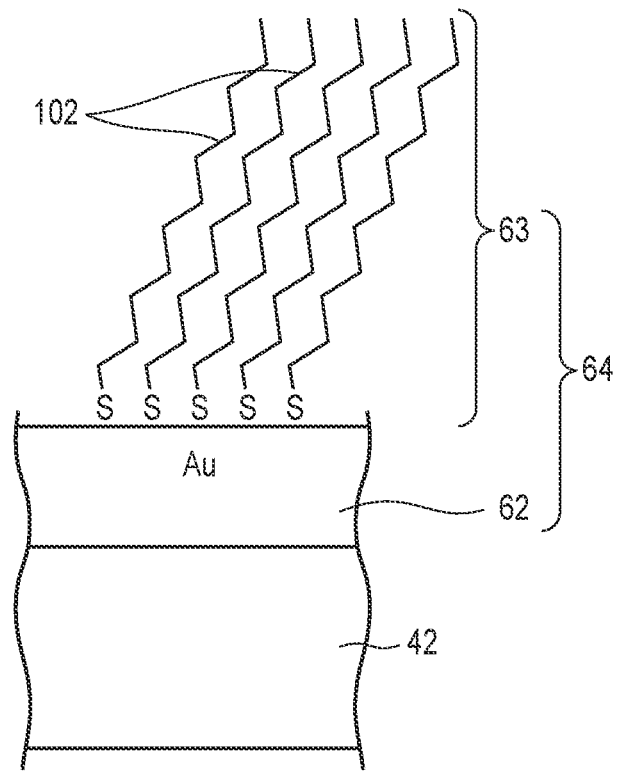
FIG. 5 is a schematic view showing an example of a self-assembled monolayer used in the embodiment.

In FIG. 5, a schematic view showing an example of a self-assembled monolayer used in the embodiment as a structure configured to prevent spreading of the lubricant from occurring is shown.

As shown in FIG. 5, the structure 64 configured to prevent the lubricant used for the caulking portion of the actuator arm from spreading can be provided at least at a part on the base plate 42 made of stainless steel as at least a part of the head suspension assembly 32. The structure 64 can include, for example, a self-assembled monolayer 63. As the self-assembled monolayer 63, for example, a self-assembled monolayer 63 of the lubricant 102 can be used. Here, as the lubricant 102, a lubricant a terminal group of which is a thiol group (—SH group) is used. Further, between the lubricant 102 and base plate 42, a reactive coating 62 constituted of gold (Au) is provided. A reaction formula of the base plate 42 and structure configured to prevent spreading of the lubricant from occurring is shown by the following formula (1).

$$RS\text{—}H + Au^0 \rightarrow RS^-Au^+ + \tfrac{1}{2}H_2 \qquad (1)$$

In the formula, R indicates an alkyl group.

The self-assembled monolayer 63 is a film formed by self-organization and, for example, a monomolecular film can be used.

As the lubricant forming the self-assembled monolayer 63, a fluorine-series liquid lubricant such as perfluoropolyether can be used. As such perfluoropolyether, for example, a chemical substance formed by substituting —SH, —COOH or —OH for a part of the terminal group —F of Fomblin (registered trade mark) Z (Solvay company) having the structure expressed by, for example, the following structural formula (2) and thereby coordinating —SH, —COOH or —OH can be used.

Fomblin Z

$$CF_3\text{-}[(OCF_2CF_2)_p\text{-}(OCF_2)_q]CF_3 \qquad (2)$$

In the above formula, p+q=from 40 to 180, and p/q=0.5 to 2.

It is possible to provide, for example, a reactive coating 62 between the self-assembled monolayer 63 and base plate 42. Here, as an example of a material for the reactive coating 62, Au is used. It is possible to use, as the reactive coating material, a material which is selectable according to the lubricant to be used, for which the lubricant to be used has an affinity, and which easily forms a self-assembled monolayer.

As an example of a combination of the lubricant and reactive coating material, for example, when the terminal group of the lubricant is an —SH group, it is possible to use a precious metal such as a metal of gold, silver, copper, platinum or the like as the reactive coating material. When the terminal group of the lubricant is a —COOH group, it is possible to use a metallic oxide such as an aluminum oxide (alumina), silver oxide, copper oxide or the like as the reactive coating material. When the terminal group of the lubricant is an —OH group, it is possible to use an oxide such as $SiO_2$ or the like as the reactive coating material.

As the base plate 42, a metallic material such as stainless steel or the like is used. As a method of forming a reactive coating 62 on the base plate 42, when the reactive coating material is Au, the plating method, and vapor-deposition method can be used and, when the reactive coating material is $SiO_2$, the CVD method can be used.

As shown in FIG. 5, regarding, for example, the lubricant 102 having a terminal group of an —SH group, it is possible to form a high-density self-assembled monolayer 63 on the surface of the reactive coating 62 constituted of, for example, gold. If the self-assembled monolayer 63 is once formed, the film 63 is chemically and firmly adsorbed by the surface of the metal of the reactive coating 62 and is in a stable state so as not to be easily separated therefrom. Accordingly, when a lubricant 102 having a certain specific terminal group is used, by forming, on the other hand, a reactive coating 62 causing self-organization on the base plate 42 by using the vapor-deposition method, plating method, CVD method or the like, it is possible to prevent the lubricant 102 from flowing to the tip end of the head 17.

Figure 6:
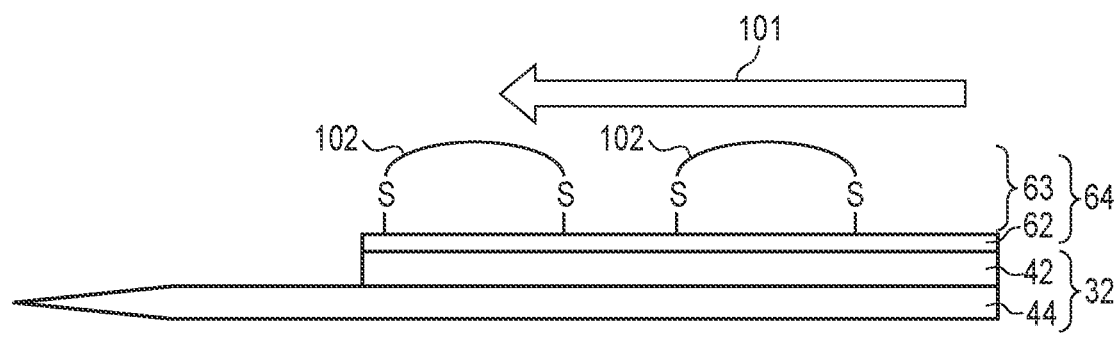
FIG. 6 is a schematic view showing a state of movement of a lubricant at the time of a head operation.

In FIG. 6, a schematic view showing a state of movement of a lubricant at the time when the head is operated is shown.

In the head suspension assembly according to the embodiment, as shown in FIG. 6, for example, on the base plate 42 attached to the load beam 44, a structure 64 configured to prevent the lubricant used for the caulking portion of the actuator arm from spreading is provided. When the head is operated, a stronger centrifugal force acts on the head in the direction indicated by an arrow 101, and the excessive lubricant 102 remaining on the caulking portion 33 after the caulking process moves in the direction of the centrifugal force. At this time, by utilizing the self-organization of the lubricant 102 on the structure 64 to cause the lubricant which has moved to the base plate 42 to be chemically adsorbed onto, for example, the base plate 42 or reactive coating 62 of, for example gold, and form a self-assembled monolayer 63, it is possible to impart a function of preventing spreading/wetting of the lubricant 102 from occurring to the self-assembled monolayer 63. As described above, by using the head suspension assembly according to the embodiment, it is possible to expect that the lubricant 102 does not flow to the tip end of the head 17 even when a centrifugal force acts thereon.

It should be noted that the reactive coating 62 and self-assembled monolayer 63 each can be omitted as the need arises.

EXAMPLE

Example 1

As the lubricant, a lubricant formed by coordinating an —SH group as the terminal group of Fomblin Z25 (molecular weight; 17100, molecular straight chain diameter; about 40 nm) manufactured by the Solvay company to coordinate the —SH group was prepared.

When the head is operated by using the magnetic disk device including a head assembly manufactured by carrying out a caulking process by using this lubricant, the lubricant adhered to the surface of the 3.5 inch disk had a diameter of several μm and thickness of about 0.08 mm.

It is assumed that the thickness of the excessive lubricant adhering to the whole surface of one disk is 0.1 mm and, when the volume of the excessive lubricant corresponding to one disk is calculated, the outer radius of the disk is 46 mm, and inner radius thereof is 18 mm, and hence the following expression was obtained.

$(46^2 \times \pi - 18^2 \times \pi) \times 0.1 =$ about $5.6 \times 10^{-4}$ mm$^3$ Further, the following calculation was carried about the case shown in, for example FIG. 5, where the head suspension assembly in which an Au reactive coating was formed on the base plate by the plating method was used, and a lubricant having a —SH group as the terminal group was applied to the surface of the Au reactive coating.

The element Au is a metal of a face-centered cubic lattice, and the lattice constant thereof is $4.08 \times 10^{-10}$ m.

The binding sites of gold to be bound to the groups per 1 mm$^2$ become $6.01 \times 10^{12}$.

As described above, the volume of the excessive lubricant is about $5.6 \times 10^{-4}$ mm$^3$.

The specific gravity of the lubricant is 1.85 g·cm$^{-3}$, and molecular weight thereof is about 17100.

From the above, when the number of the binding sites existing in the excessive lubricant is calculated, the number is $3.6 \times 10^{13}$.

Accordingly, it can be seen that when the Au reactive coating of 6 mm$^2$ exists on the base plate, it is possible to sufficiently capture the excessive lubricant.

As described above, according to the embodiment, by providing the Au reactive coating which easily forms the self-assembled monolayer based on the lubricant to be used for the caulking portion by a sufficient area on the base plate as the structure configured to prevent spreading of the lubricant to be used for the caulking portion of the actuator arm from occurring, it can be seen that it is possible to prevent the lubricant from flowing to the head tip end and contaminating the head tip end. Thereby, it becomes possible to enhance the reliability of the magnetic disk device.

While certain embodiments have been described, these embodiments have been presented by way of example only, and are not intended to limit the scope of the inventions. Indeed, the novel embodiments described herein may be embodied in a variety of other forms;

furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A head suspension assembly comprising:
   a base plate which is attached to an actuator arm by a caulking portion,
   a self-assembled monolayer on at least a part of the base plate, formed by self-organization of a lubricant which is applied to the caulking portion of the actuator arm and possesses a terminal group forming the self-assembled monolayer,
   a reactive coating which is provided between the self-assembled monolayer and the base plate, and
   a load beam including a base end portion which is arranged to overlap a tip end portion of the base plate.

2. The head suspension assembly of claim 1, wherein, when the terminal group is an —SH group, a material of the reactive coating is gold, silver, copper or platinum, when the terminal group is a —COOH group, the material of the reactive coating is aluminum oxide, silver oxide or copper oxide and, when the terminal group is an —OH group, the material of the reactive coating is SiO$_2$.

3. A magnetic recording/reproducing device comprising:
   a magnetic recording medium; and
   a head suspension assembly which comprises:
   a base plate attached to an actuator arm by a caulking portion,
   a self-assembled monolayer on at least a part of the base plate, formed by self-organization of a lubricant which is applied to the caulking portion of the actuator arm and possesses a terminal group forming the self-assembled monolayer, a reactive coating which is provided between the self-assembled monolayer and the base plate, and a load beam including a base end portion which is arranged to overlap a tip end portion of the base plate.

4. The magnetic recording/reproducing device of claim 3, wherein, when the terminal group is an —SH group, a material of the reactive coating is gold, silver, copper or platinum, when the terminal group is a —COOH group, the material of the reactive coating is aluminum oxide, silver oxide or copper oxide and, when the terminal group is an —OH group, the material of the reactive coating is $SiO_2$.

* * * * *